United States Patent [19]

Fox et al.

[11] Patent Number: 5,037,053
[45] Date of Patent: Aug. 6, 1991

[54] SUPPORT ARM FOR OPTICAL ACCESSORIES

[75] Inventors: Daniel R. Fox, Greenville, Ohio; Terry J. Simpkins, Jr.; Terry J. Simpkins, Sr., both of Carlsbad, Calif.

[73] Assignee: Midmark Corporation, Versailles, Ohio

[21] Appl. No.: 571,357

[22] Filed: Aug. 23, 1990

[51] Int. Cl.⁵ .............................................. A47F 13/00
[52] U.S. Cl. .................................. 248/278; 248/280.1; 248/281.1; 403/55
[58] Field of Search .................. 248/278, 280.1, 281.1, 248/183, 276; 403/55

[56] References Cited

U.S. PATENT DOCUMENTS

| | | | |
|---|---|---|---|
| 2,456,003 | 12/1948 | Knutson | 248/278 X |
| 2,802,633 | 8/1957 | Moore | 403/55 X |
| 3,910,538 | 10/1975 | Baitella | 248/276 X |
| 4,236,844 | 12/1980 | Mantele | 403/55 |
| 4,320,884 | 3/1982 | Leo | 248/276 |
| 4,402,481 | 9/1983 | Sasaki | 248/276 |
| 4,431,329 | 2/1984 | Baitella | 248/276 X |
| 4,548,373 | 10/1985 | Komura | 248/280.1 X |

FOREIGN PATENT DOCUMENTS 519451   5/1953   Belgium .................. 248/278

Primary Examiner—David L. Talbott
Attorney, Agent, or Firm—Biebel & French

[57] ABSTRACT

The present invention provides a support arm for optical accessories such as are used during the examination of eyes for determining the corrective eyeglass lens required. The support arm is supported by a vertical support post which defines a first axis about which the arm may be pivot. The support arm further includes a first hub portion adjacent to the support post and a second hub portion distal from the support post wherein a vertical mounting shaft extends from the second hub portion for supporting an optical accessory. A parallelogram structure extends between the first and second hub portions such that the second hub portion may be moved vertically relative to the first hub portion about a second horizontal axis located at the first hub portion while maintaining the mounting shaft in a vertical position. Further, the mounting shaft for the optical accessory may be rotated about a third axis along the longitudinal axis of the shaft to position the optical accessory at different locations around the second hub portion. The weight of the optical accessory is counterbalance by a tension spring which biases the parallelogram structure to a horizontal position and thus counteracts the weight of the optical accessory. The support arm is further provided with a locking lever mounted to the second hub portion for simultaneously locking the support arm against movement about the first, second and third axes.

18 Claims, 4 Drawing Sheets

SUPPORT ARM FOR OPTICAL ACCESSORIES

BACKGROUND OF THE INVENTION

The present invention relates to a stand for optical equipment and, more particularly, to a stand having a movable support arm for optical equipment used in the examination of a patient's eyes.

During a typical eye examination, a physician will often use optical accessories which must be accurately aligned with the patient's eyes and which are generally relatively heavy such that a support structure must be provided to support the accessory. The accessory may be in the form of a device which carries a plurality of lenses to aid the examining physician in determining the corrective eyeglass lenses required for the patient. The device is typically aligned with both of the patient's eyes and thus the support structure must provide for movement in a vertical direction, a horizontal direction toward and away from the patient and in a direction which allows a plane of the device containing the lenses to be aligned perpendicular to the patient's line of sight.

The support structure for mounting the accessory is typically in the form of an elongated arm which is mounted to a vertical support post. Counterbalancing means such as a tension spring is often provided to bias the arm upwardly and thereby counterbalance the weight of the accessory. Further, the arm may be constructed with a parallelogram structure which pivots in a vertical plane about an axis located adjacent to the post such that the angular relationship between the accessory and the post will remain constant as the arm structure is pivoted in a vertical direction.

In addition to the above-described pivoting motion of the arm, the support structures of prior art devices have also included means for permitting the arm to pivot about the vertical axis of the support post and for permitting the accessory to pivot about a vertical axis located adjacent to the end of the arm distal from the post and thereby provide pivoting movement about three separate axes.

In order to lock the accessory in a desired position relative to a patient, prior art devices have included a pair of adjustment knobs wherein a first knob is located adjacent to the support post for locking the support arm against pivotal movement about the axis of the post, and a second knob is provided adjacent to the end of the arm distal from the post for both locking the arm against vertical movement and for locking the accessory against pivotal movement about the axis at the distal end of the arm.

Thus, the person adjusting the position of the accessory must alternate between locking the two adjusting knobs until the accessory is finally locked into the desired position relative to the patient's eyes. This arrangement has proven to be inconvenient since movement of the accessory about one of the vertical axes will usually necessitate a corresponding movement about the other vertical axis such that both of the locking knobs must be manipulated.

Accordingly, there is a need for a counterbalanced optical support arm which allows an accessory to be manipulated about three separate axes and in which the arm may be simultaneously locked against movement about all three axes by a single easily manipulated mechanism.

SUMMARY OF THE INVENTION

The present invention provides an optical accessory support arm which may be mounted to a vertical support post and which includes a base portion in the form of a split collar having an elongated aperture which may be received in sliding contact over the support post for pivotal movement about a first axis defined by the support post. The base portion includes means for supporting the support arm which are formed integrally with the split collar and which include a plate portion connected to a first edge of the split collar and a ring portion connected to an opposing second edge of the split collar. The plate and ring portions form a first rear hub half and are positioned in spaced relation to one another such that movement of the plate and ring portions toward each other results in the collar being forced into immovable locking contact around the support post.

An arm portion in the form of an elongated hub casing is positioned adjacent to the base portion and includes a first end having a front hub half which is positioned in contact with the ring portion such that the arm portion may be pivoted about a second axis at the first end thereof.

A second end of the support arm distal from the base portion includes a structure for supporting an optical accessory thereto comprising a cylindrical mounting shaft extending substantially vertically downwardly and mounted for rotation about a third axis defined by the longitudinal axis of the mounting shaft. The mounting shaft is connected to a parallelogram structure which includes a pair of substantially parallel links extending between the first and second ends of the support arm. Thus, as the second end of the support arm is moved vertically relative to the first end, the mounting shaft is maintained in a substantially constant angular position relative to the support post.

In addition, the support arm is provided with counterbalancing means in the form of a tension spring which extends substantially parallel to the parallel links. Each of the parallel links is provided with a mounting bracket located at opposing ends of the arm and opposing ends of the spring are attached to the mounting brackets whereby the spring applies a biasing force to bias the arm toward a horizontal position and thus counteract the weight of an optical accessory mounted at the second end of the arm.

The second end of the support arm includes front and rear hub halves and the mounting shaft is located within the rear hub half. The front hub half at the second end of the support arm is rigidly connected to the first end front hub half by the hub casing and the second end rear hub half is connected to the ring portion of the first end rear hub half by the parallelogram structure such that as the second end of the support arm is moved vertically, the first and second front hub halves will move relative to the first and second end rear hub halves.

A locking block having means defining an aperture therethrough is located over the mounting shaft within the second end rear hub half and includes means defining a threaded aperture oriented along a line substantially perpendicular to and intersecting the first aperture. A threaded bolt extends through the second end front hub half and into the second threaded aperture of the locking block to thereby hold the second end front and rear hub halves together. Similarly, a bolt extends through the first end front and rear hub halves to engage a threaded aperture formed in the plate portion to thereby hold the first end front and rear hub halves together.

A first sprocket wheel is mounted for rotation with the threaded bolt extending through the first hub halves and a second sprocket wheel is rigidly mounted on the other threaded bolt extending through the second hub halves. An endless chain extends around the first and second sprocket wheels such that the bolts within the first and second hubs are linked together for simultaneous rotation.

A locking lever is mounted adjacent to the second end front hub half for rotation relative to the support arm and is rigidly attached to the threaded bolt passing through the second end hub halves. Thus, rotation of the locking lever results in the threaded bolt at the second end rotating to pull the locking block toward the second end front hub half whereby the second end front and rear hub halves are brought into contact with each other to prevent relative rotation between the hub halves and lock the parallelogram structure in position to prevent vertical movement of the second end of the arm portion. In addition, as the locking block is drawn transversely to the longitudinal axis of the mounting shaft, a frictional force is produced between the locking block and the mounting shaft to prevent rotation of the mounting shaft about its longitudinal axis.

Further, as a result of the rotation of the lever and its associated threaded bolt, the second sprocket wheel is caused to rotate which rotation is transmitted by the chain to the first sprocket wheel. As the first sprocket wheel and its associated threaded bolt is rotated, the plate portion of the first end rear hub half is drawn toward the first end front hub half as well as toward the ring portion such that the split collar is caused to tighten around the support post to thereby prevent rotation of the support arm about the vertical axis of the support post.

Thus, the present invention provides a counterbalanced support arm for supporting an optical accessory wherein means are provided for permitting movement of the support arm about three separate axes and for simultaneously locking the support arm against movement about all three axes.

Other objects and advantages of the invention will be apparent from the following description, the accompanying drawings and the appended claims.

DETAILED DESCRIPTION OF THE PREFERRED EMBODIMENT

Figure 1:
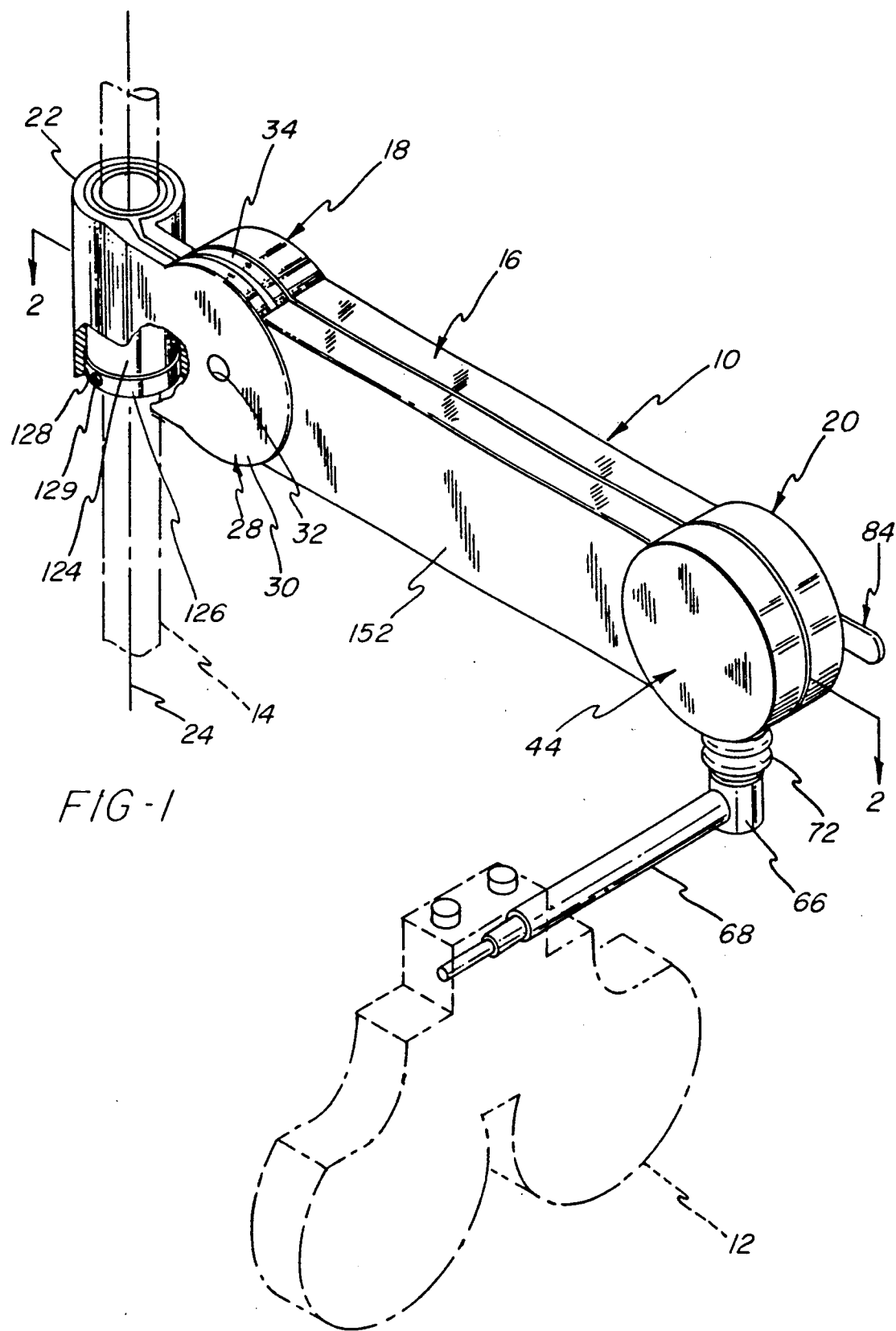
FIG. 1 is a perspective view of the support arm of the present invention.

As may be seen in FIG. 1, the present invention provides an optical support arm 10 which is adapted to support an optical accessory, generally designated 12, and which may be supported by a vertical support post 14.

The support arm 10 includes an elongated hub casing 16 defining an elongated arm structure having a substantially cylindrically shaped first front hub half 18 and a substantially cylindrically shaped second front hub half 20 located at opposing ends thereof. The hub casing 16 is preferably formed as an integral structure such that the first and second hub halves 18, 20 are stationary relative to each other.

A base portion 22 is provided for supporting the support arm 10 at the vertical post 14 and includes means for supporting the hub casing 16 for pivotal movement about a first longitudinal axis 24 defined by the support post 14 as well as about a second horizontally oriented axis 26 (FIG. 2), as will be described further below.

The means for supporting the hub casing 16 is formed by a substantially cylindrically shaped first rear hub half 28 including a first hub plate 30 having means defining a threaded aperture 32 therethrough, and a first hub ring 34. As may be seen in FIG. 2, the hub ring 34 includes opposing front and rear sides 36, 38, respectively, and the hub plate 30 is positioned adjacent to and spaced from the rear side 38 of the hub ring 34.

The base portion 22 is formed as a split collar having first and second opposing edges 40, 42 wherein the hub plate 30 extends from the first edge 40 and the hub ring 34 extends from the second edge 42. Thus, the first rear hub half 28 is formed as an integral structure with the base portion 22 such that changes in the spacing between the hub plate 30 and hub ring 34 may directly affect the spacing between the edges 40, 42 of the split collar.

Figure 3:
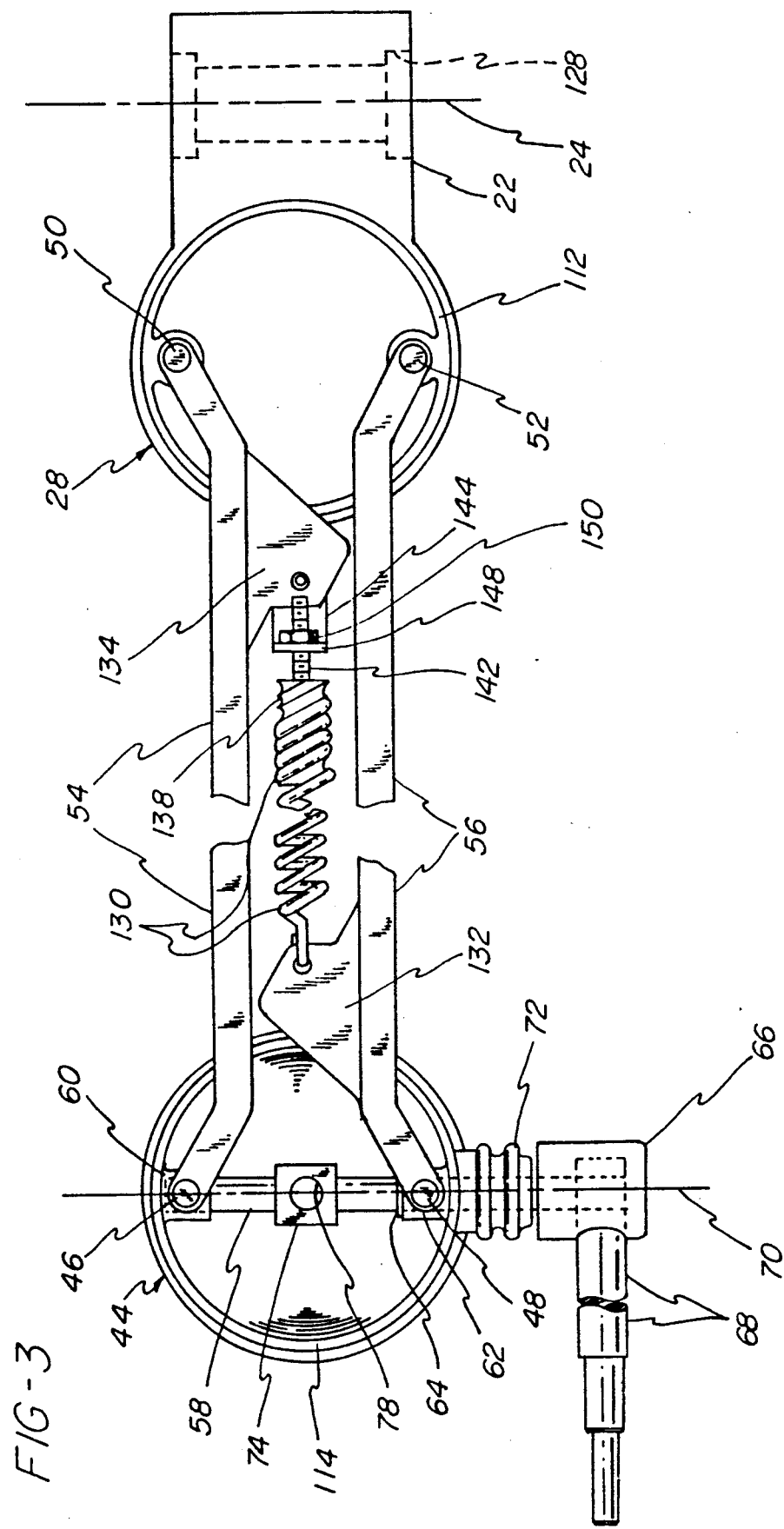
FIG. 3 is an elevational view of the rear half of the support arm with the cover portion removed.

A second substantially cylindrically shaped rear hub half 44 is positioned adjacent to the second front hub half 20 and includes upper and lower link attachment points 46, 48 on diametrically opposed sides of the second rear hub half 44, as may be seen in FIG. 3. In addition, the first rear hub half 28 includes upper and lower link attachment points 50, 52 located on diametrically opposed sides of the hub ring 34 and which are oriented substantially parallel to the upper and lower link attachment points 46, 48 on the second front hub half 44.

An upper link 54 extends between the upper link attachment points 50, 46 of the first and second rear hub halves 28, 44 and a lower link 56 extends between the lower link attachment points 52, 48. The upper and lower links 54, 56 are attached to the first and second rear hub halves 28, 44 by conventional fastener means such as bolts which permit relative pivotal movement between the links 54, 56 and the rear hub halves 28, 44. The links 54, 56 together with the rear hub halves 28, 44 form a parallelogram structure such that, as the first rear hub half 28 is held in a stationary position on the support post 14 and the links 54, 56 pivot about the attachment points 50, 52, the second rear hub half 44 may be moved to different vertical positions while maintaining the parallel relationship between the link attachment points 46, 48 at the second end of the arm 10 and the link attachment points 50, 52 at the first end of the arm 10. Thus, as the arm 10 is pivoted about the second axis 26 at its first end, the first rear hub half 28 will remain stationary relative to the post 14 and the first front hub half 18 will pivot relative to the first rear hub half 28. In addition, the upper and lower links 54, 56 will cause the second rear hub half 44 to rotate relative to the second front hub half 20 which remains stationary relative to the first front hub half 18 as the arm 10 is pivoted.

A mounting shaft 58 extends through the second rear housing half 44 along a line substantially parallel to a line extending through the upper and lower link attachment points 46, 48. The mounting shaft 58 extends upwardly into a recess formed in an upper bearing block 60 which is preferably formed integrally with the second rear hub half and which forms the upper link attachment point 46. In addition, the mounting shaft 58 extends through a lower bearing block 62 forming the lower link attachment point 48 and extends downwardly out of the second rear housing half 44. The mounting shaft 58 is prevented from sliding downwardly out of the housing 44 by means of a conventional retaining ring 64 attached to the shaft 58 adjacent to an upper surface of the lower bearing block 62.

A pivot support block 66 is rigidly attached to a lower end of the mounting shaft 58. The support block 66 forms a coupling for supporting an optical support shaft 68 for pivotal movement about a third axis 70 defined by the longitudinal axis of the mounting shaft 58. Thus, an optical accessory 12 mounted to the support shaft 68 may be rotated about the axis 70 resulting in rotation of the mounting shaft 58 within the upper and lower bearing blocks 60, 62.

In the preferred embodiment, the support block 66 is spaced from the bottom portion of the second rear housing half 44 by a spacing collar 72 which is preferably formed integrally with the housing half 44.

Figure 2:
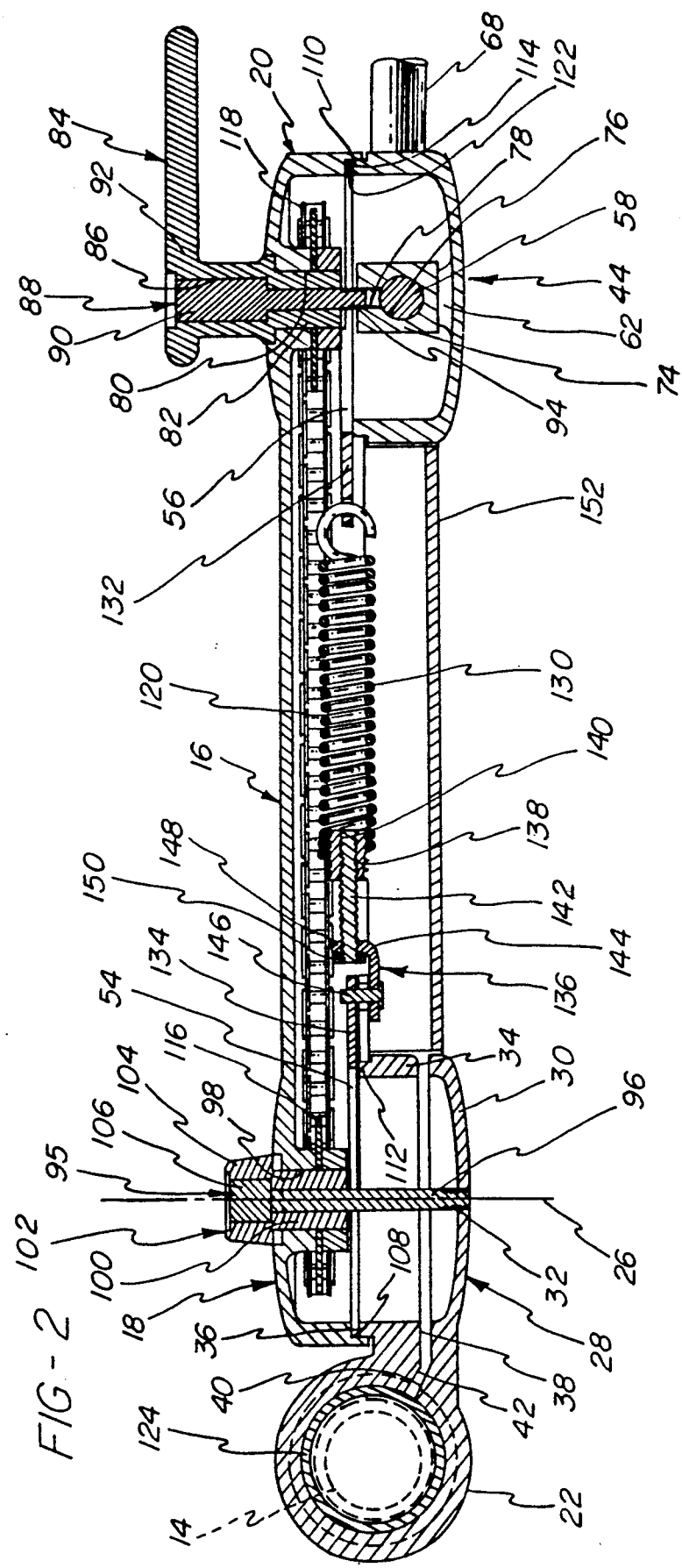
FIG. 2 is a cross sectional view along line 2—2 of FIG. 1.

Referring to FIGS. 2 and 3, a locking block 74 is located within the second rear hub half 44 and includes means defining a first aperture 76 having a smooth interior surface and extending through the block 74 for rotatably receiving the mounting shaft 58 whereby the locking block 74 is mounted to the shaft 58 in spaced relation to the interior of the second rear hub half 44. The locking block 74 further includes means defining a second threaded aperture 78 oriented substantially perpendicular to and intersecting the first aperture 76.

The second front hub half 20 includes means defining an aperture 80 through a central portion thereof for receiving a shank portion 82 of a locking lever 84. The lever 84 includes means defining an aperture 86 for receiving a threaded bolt 88 therein. The threaded bolt 88 includes a head portion 90 which is positioned within a handle portion 92 of the lever 84 and a threaded shank portion 94 which extends into and engages with the threads of the second aperture 78 of the locking block 74. Thus, the front and rear second hub halves 20, 44 are held together by the threaded bolt 88 extending between the lever 84 on the front half 20 and the locking block 74 on the rear hub half 44.

Similarly, the first front and rear hub halves 18, 28 are held together by a threaded bolt 95 which has a shank portion 96 engaged within the threaded aperture 32 in the plate portion 30 of the first rear hub half 28.

As may be seen in FIG. 2, the first front hub half 18 includes means defining an aperture 98 for receiving the shaft portion 100 of a rotator 102 wherein an outer head portion 104 of the rotator 102 engages an outer surface of the first front hub half 18. A head portion 106 of the bolt 95 is held within the head portion 104 of the rotator 102 such that the bolt 95 acts to hold the front and rear first hub halves 18, 28 in position adjacent to each other.

Figure 4:
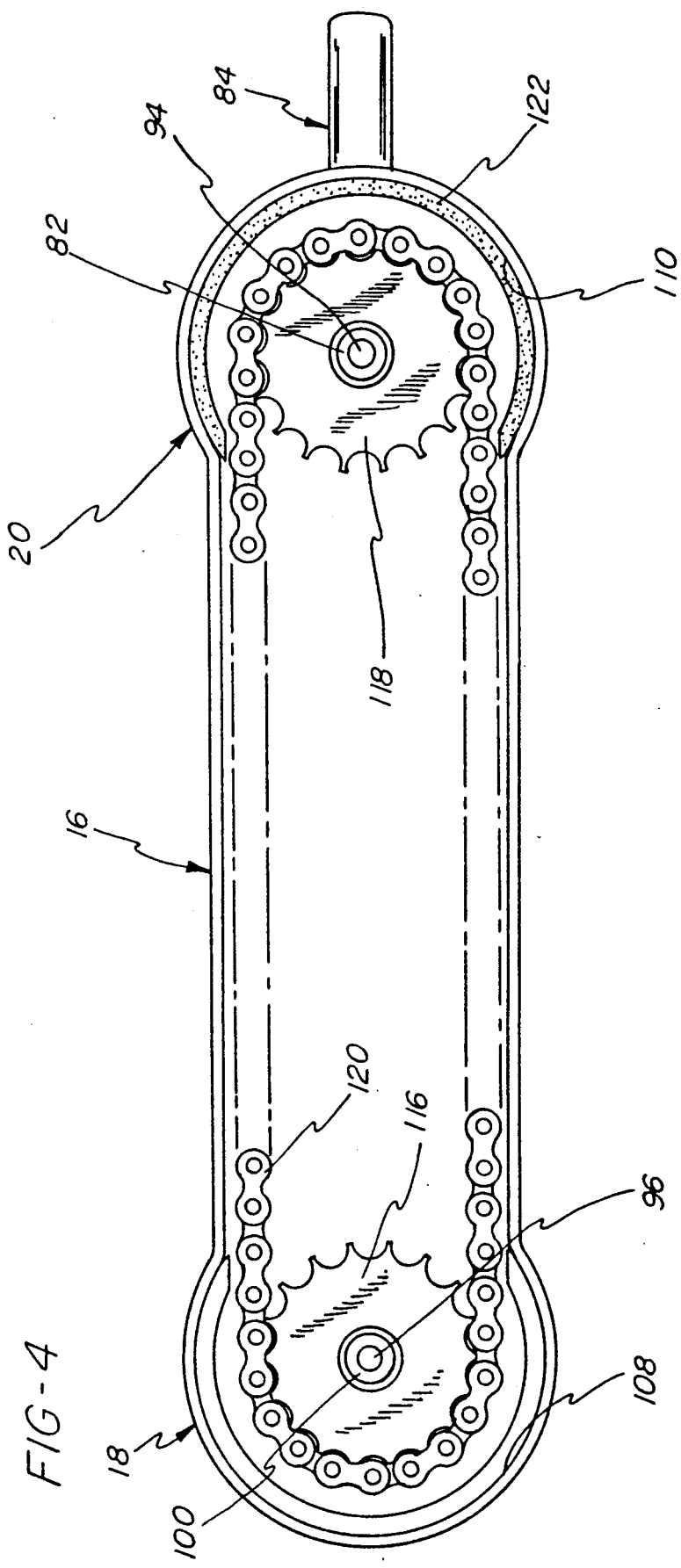
FIG. 4 is an elevational view of the front half of the support arm.

It should be noted that the first and second front hub halves 18, 20 are provided with substantially circular groove portions 108, 110, as may be seen in FIGS. 2 and 4. Further, the first and second rear hub halves 28, 44 are provided with substantially circular lip portions 112, 114, as may be seen in FIGS. 2 and 3, for engagement within respective grooves 108, 110. The groove portions 108, 110 and lip portions 112, 114 cooperate with each other to align the front and rear hub portions with each other during rotation of the support arm 10 about the second axis 26.

Referring to FIGS. 2 and 4, first and second sprocket wheels 116, 118 are mounted within the first and second front hub halves 18, 20 of the hub casing 16 and are rigidly mounted to the rotator 102 and locking lever 84, respectively. Further, the bolts 95 and 88 are rigidly attached to the rotator 102 and sprocket wheel 116 and to the locking lever 84 and sprocket wheel 11B, respectively, such that rotation of the sprocket wheels 116, 118 results in corresponding rotation of their respective bolts 95, 88.

In addition, an endless chain 120 extends around the sprocket wheels 116, 118 whereby rotational movement of the locking lever 84 relative to the hub casing 16 may be transferred from the sprocket wheel 118 at the second end of the support arm 10 to the sprocket wheel 116 at the first end of the support arm 10.

As the locking lever 84 is rotated counter-clockwise, as seen in FIG. 1, the threaded bolt 88 is caused to rotate within the second locking block aperture 78 and thereby draw the locking block 74 and second rear hub portion 44 toward the second front hub half 20. The second front hub half groove 110 is provided with a high friction facing material 122 (see FIG. 4) for engaging the second rear hub half lip 114 when the front and rear second hub halves 20, 44 are drawn together such that relative rotation between the hub halves 20, 44 is prevented through frictional contact.

In addition, as the locking block 74 is drawn toward the second front hub half 20 in a direction transverse to the longitudinal axis of the mounting shaft 58, the means defining the aperture 76 engages the mounting shaft 58 in frictional contact to thereby lock the shaft 58 against rotational movement about the third axis 70. It should be noted that locking the second front and rear hubs 20, 44 together results in the parallelogram structure formed by the upper and lower links 54, 56 and the first and second hub rear halves 28, 44 of the support arm 10 being locked against movement such that the vertical position of the second end of the support arm 10 is fixed relative to the vertical position of the first end of the support arm 10. Thus, it can be seen that rotation of the bolt 88 results in locking the support arm 10 against movement about the second and third axes 26, 70.

Rotation of the locking lever 84 in the counterclockwise direction, as seen in FIG. 1, also results in the bolt 95 being rotated through the chain 120 and sprocket wheels 116, 118. Referring to FIG. 2, as the bolt 95 is rotated counterclockwise, as seen from the rear half of the arm 10, the plate portion 30 is drawn toward the ring portion 34 and the first front hub half 18 such that the opposing edges 40, 42 of the base portion 22 are drawn together to thereby lock the support arm 10 to the support post 14 and prevent rotation about the first axis 24. It should be noted that a bearing sleeve 124 is preferably located between the base portion 22 and the support post 14 and includes an outwardly extending flange portion 126 at a lower end thereof. Further, the base portion 22 includes a recess 128 sized to receive the flange portion 126.

The insert 124 is attached to the support post 14 by conventional means such as set screws 129 and acts as a bearing surface upon which the support arm 10 may rotate about the first axis 24.

Referring to FIGS. 2 and 3, the support arm 10 is provided with counterbalancing means in the form of a tension spring 130. The spring 130 is attached at one end to a mounting bracket 132 formed integrally with the lower link 56, and is attached at an opposite end to a mounting bracket 134 on the upper link 54 through an adjustment assembly 136.

The adjustment assembly 136 includes a spring engaging insert 138 having a threaded exterior which engages the interior of the spring 130. The insert 138 includes means defining a threaded aperture 140 for receiving a threaded stud 142. An angled bracket 144 is attached to the mounting bracket 134 by fastener means such as a bolt 146 and includes a transversely extending leg 148 having an aperture therethrough. The stud 142 extends through the aperture in the leg 148 and an adjustment nut 150 is attached to the end of the stud 142. Thus, by rotating of the adjustment nut 150, the tension on the spring 130 may be adjusted as the insert 138 is drawn toward and away from the angled bracket 144.

It should be apparent that as the support arm 10 is pivoted away from a horizontal position, the spacing between the mounting brackets 132, 134 increases thereby producing tension on the spring 130. This tension on the spring 130 causes a counterbalancing force tending to move the arm back to its horizontal position and thus counteracts the weight of an optical accessory 12 mounted to the support shaft 68.

As may be seen in FIG. 2, the support arm may be provided with a cover portion 152 which extends over the upper and lower links 54, 56 and over the tension spring 130 to attach to the hub casing 16.

From the above description it should be apparent that the present invention provides a support arm for supporting optical accessories in which a single locking lever may be provided for locking the arm against movement about three separate axes. Thus, the present optical support arm increases the ease with which the optical accessory may be positioned and locked in place by eliminating the necessity to alternately tighten or loosen a plurality of locking knobs.

While the form of apparatus herein described constitutes a preferred embodiment of the invention, it is to be understood that the invention is not limited to this precise form of apparatus and that changes maybe made therein without departing from the scope of the invention which is defined in the appended claims.

What is claimed is:

1. An optical support arm comprising:
   an arm portion having first and second ends;
   a base portion for supporting said arm portion for rotation about a first axis at said first end, said base portion including a collar forming an elongated aperture for receiving a support post and defining said first axis;
   support means attached to said base portion for supporting said arm portion adjacent to said first end for rotation about a second axis;
   a mounting shaft located on said arm portion in spaced relation to said second axis and mounted for rotation about a third passing through said mounting shaft such that said third axis is oriented parallel to said mounting shaft; and
   a locking member mounted to said second end adjacent to said mounting shaft, said locking member mounted for rotation relative to said arm portion such that rotation of said locking member to a locking position simultaneously locks said arm portion and said mounting shaft against rotation about said first and third axes, repsectively.

2. The support arm of claim 1 wherein said movement of said locking lever to said locking position further locks said arm portion against rotation about said second axis.

3. The support arm of claim 1 wherein said first and second axes are substantially perpendicular to each other.

4. The support arm of claim 1 including means located at said second end of said arm portion for locking said arm portion against movement about said second axis wherein said locking member is located adjacent to said means for locking said arm portion against movement about said second axis.

5. The support arm of claim 4 including means located at said first end adjacent to said base portion for locking said arm portion against movement about said first axis.

6. The support arm of claim 5 including linkage means for transferring movement of said locking member to said means for locking said arm portion against movement about said first axis.

7. The support arm of claim 6 wherein said locking member is mounted for rotation and said linkage means includes a sprocket wheel mounted at said second end of said arm portion for rotation with said locking member, a sprocket wheel mounted for rotation at said first end of said arm portion and a chain for transferring rotational movement of said sprocket wheel at said second end of said arm portion to said sprocket wheel at said first end of said arm portion.

8. The support arm of claim 1 wherein said arm portion includes a pair of substantially parallel link members extending between said first and second ends to form a parallelogram structure whereby the angular orientation of said third axis relative to said first axis remains constant.

9. An optical support arm comprising:
   a base portion including means defining an elongated aperture for receiving a support post such that said base portion may be rotated about a longitudinal axis of said aperture;
   an arm portion having first and second ends, said first end being located adjacent to said base portion and said second end being located distal from said base portion, and said arm portion being mounted for pivotal movement about an axis angularly displaced from the longitudinal axis at said first end;
   a mounting shaft mounted at said second end of said arm portion for rotation about a longitudinal axis of said shaft;
   a locking lever mounted to said arm portion for movement relative to said arm portion such that movement of said lever to a locking position simultaneously locks said base portion against rotation about the longitudinal axis of said aperture, locks said arm portion against pivotal movement about said first end and locks said shaft against rotation about the longitudinal axis of said shaft, and
   linkage means extending between said first and second ends whereby the angular relationship between the longitudinal axis of said aperture and the longitudinal axis of said shaft remains substantially constant during pivotal movement of said arm portion.

10. The support arm of claim 9 wherein said linkage means comprises a pair of substantially parallel link members extending between said first and second ends of said arm portion to maintain said shaft in said substantially constant angular relationship.

11. The support arm of claim 10 including a counterbalancing tension spring attached to and oriented parallel to each of said link members.

12. The support arm of claim 10 including first and second hub portions located at said first and second ends, respectively, wherein said pair of link members and said first and second hub portions form a parallelogram structure.

13. The support arm of claim 9 wherein said base portion includes a split collar having first and second opposing edges and a plate portion and ring portion are attached to said opposing edges at said first end of said arm portion wherein movement of said lever causes said plate and ring portions to move toward each other to lock said base portion against rotation about the longitudinal axis of said aperture.

14. The support arm of claim 9 including a hub portion located at said second end of said arm portion, said hub portion including front and rear hub halves which are positioned such that said hub halves may rotate relative to each other during pivotal movement of said arm portion about said first end.

15. The support arm of claim 14 wherein said movement of said lever causes said front and rear hub halves to engage each other to thereby prevent relative rotation between said hub halves whereby said arm portion is locked against pivotal movement about said first end.

16. The support arm of claim 9 including a locking block having means defining an aperture positioned such that said shaft extends through said locking block aperture and said movement of said lever causes said locking block to move transversely to the longitudinal axis of said shaft whereby rotation of s id shaft is prevented.

17. The support arm of claim 9 wherein said mounting shaft is oriented substantially parallel to the longitudinal axis of said aperture in said base portion.

18. A counterbalanced optical support arm comprising:
an elongated hub casing defining an elongated arm structure having opposing ends and including a first front hub half at one end and a second front hub half at an opposite end, said hub casing being formed as an integral structure such that said first and second front hub halves are stationary relative to each other;
a first rear hub half positioned adjacent to said first front hub half, said first rear hub half being substantially cylindrically shaped and including upper and lower link attachment points on diametrically opposed sides thereof;
a second rear hub half positioned adjacent to said second front hub half, said second rear hub half being substantially cylindrically shaped and including upper and lower link attachment points on diametrically opposed sides thereof oriented along a line substantially parallel to a line passing through said link attachment points on said first rear hub half;
upper and lower links extending substantially parallel to each other and attached to respective ones of said upper and lower link attachment points on said first and second rear hub halves to thereby form a parallelogram structure, said links being mounted for pivotal movement relative to said rear hub halves such that said second rear hub half may be moved relative to said first rear hub half;
said first rear hub half including a first hub plate having means defining a threaded aperture therethrough, and a first hub ring having opposing front and rear sides wherein said hub plate is positioned adjacent to and spaced from said rear side of said hub ring and a substantially circular peripheral lip extends outwardly from said front side of said hub ring;
said second rear hub half including an outwardly extending substantially circular peripheral lip on a front side thereof;
first and second substantially circular grooves formed in respective ones of said first and second front hub halves for receiving said peripheral lips of said first and second rear hub halves, said first front and rear hub halves being rotatable relative to each other and said second front and rear hub halves being rotatable relative to each other to allow said movement of said second rear hub half relative to said first rear hub half;
an elongated cylindrical mounting shaft positioned within said second rear hub half, said mounting shaft extending diametrically across said second rear hub half and oriented substantially parallel to a line through said second rear hub upper and lower link attachment points;
a substantially rectangular locking block including means defining a first aperture therethrough and means defining a second aperture oriented substantially perpendicular to and intersecting said first aperture, said first aperture including a smooth interior surface and being sized to receive said mounting shaft such that said mounting shaft may be rotated relative to said locking block, said second aperture including threads along an interior surface thereof;
a support block attached to said mounting shaft adjacent to an exterior portion of said second rear hub half;
a support shaft attached to said support block and extending perpendicular to said mounting shaft for supporting an optical accessory;
a substantially cylindrical split collar formed integrally with said first rear hub half including first and second opposing edges, said first hub plate extending from said first edge and said first hub ring extending from said second edge;
a lower recess formed in an end of said split collar;
a substantially cylindrical ring bearing for attachment to a support post, said ring bearing being sized to be received within said split collar, said ring bearing having a flange portion sized to be received within said lower recess in said split collar wherein said ring bearing may support said support arm in pivotal movement about the post;
first and second sprocket wheels mounted for rotation within said first and second front hub halves;
an endless chain extending around said first and second sprocket wheels;
a first bolt rigidly attached to said first sprocket wheel, said first bolt having a head engaging an outer portion of said first front hub half and a threaded shank engaged within said threaded aperture in said first hub plate whereby said front and rear first hub halves are held in position adjacent to each other;

a second bolt rigidly attached to said second sprocket wheel, said second bolt having a head engaging an outer portion of said front hub half and a threaded shank engaged within said second aperture in said locking block whereby said front and rear second hub halves are held in position adjacent to each other;

a lever positioned adjacent to said second front hub half and rigidly attached to said second sprocket wheel such that said lever may be rotated to cause said second bolt to draw said locking block and said second rear hub half toward said second front hub half;

a high friction material positioned within said substantially circular groove in said second front hub half for engaging said peripheral lip of said second rear hub half;

a first mounting bracket attached to said upper link adjacent to said first hub halves and extending between said upper and lower links;

a second mounting bracket attached to said lower link adjacent to said second hub halves and extending between said upper and lower links;

a tension spring having opposing ends attached to said first and second mounting brackets to provide a counterbalancing force to said support arm;

a cover attached to and extending along said elongated arm structure from said first to said second hub halves to enclose said links and said tension spring; and wherein said lever may be located in a first rotational position which permits said mounting shaft to rotate about its longitudinal axis, said second rear hub half to move relative to said first rear hub half, and said split collar to rotate relative to said ring bearing mounted on a support post for supporting said arm, and a second rotational position of said lever in which said locking block and said second rear hub half are drawn toward said second front hub half to cause said locking block to be forced sideways against and prevent rotation of said mounting shaft and to cause said peripheral lip of said second rear hub half to engage said high friction material to prevent relative rotation between said front and rear second hub halves and thereby lock the parallelogram structure formed by said hub halves and said links in position, and movement of said lever to said second position being transferred from said second sprocket wheel to said first sprocket wheel through said chain whereby said first hub plate is drawn toward said first hub ring to thereby draw said opposing edges of said split ring together and lock said arm against rotation relative to said ring bearing.

* * * * *

UNITED STATES PATENT AND TRADEMARK OFFICE
CERTIFICATE OF CORRECTION

PATENT NO. : 5,037,053

DATED : August 6, 1991

INVENTOR(S) : Daniel R. Fox et al

It is certified that error appears in the above-identified patent and that said Letters Patent is hereby corrected as shown below:

Column 7, line 59, "axis" has been omitted after the word "third".

Column 9, line 36, "s id" should be --said--.

Signed and Sealed this

Twenty-sixth Day of January, 1993

Attest:

STEPHEN G. KUNIN

*Attesting Officer*  *Acting Commissioner of Patents and Trademarks*